Aug. 8, 1967  P. F. GRAMLICH ETAL  3,335,380
GROUND LEVEL TRANSFORMER WITH CABINET
Filed July 16, 1965
4 Sheets-Sheet 1

INVENTORS
JOHN L. FISHER
PAUL F. GRAMLICH
BY Lee H. Kaiser
ATTORNEY

Aug. 8, 1967

P. F. GRAMLICH ETAL 3,335,380

GROUND LEVEL TRANSFORMER WITH CABINET

Filed July 16, 1965

INVENTORS
JOHN L. FISHER
PAUL F. GRAMLICH

BY

Lee H Kaiser

ATTORNEY

Aug. 8, 1967  P. F. GRAMLICH ETAL  3,335,380
GROUND LEVEL TRANSFORMER WITH CABINET
Filed July 16, 1965  4 Sheets-Sheet 3
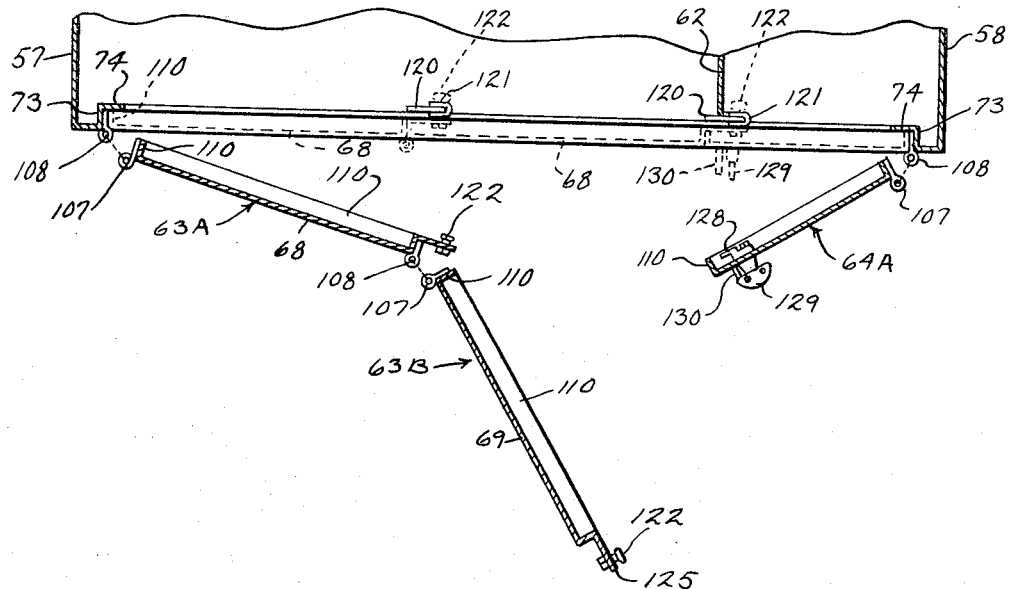
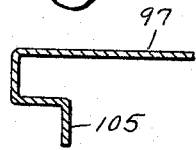
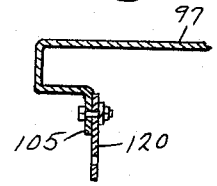
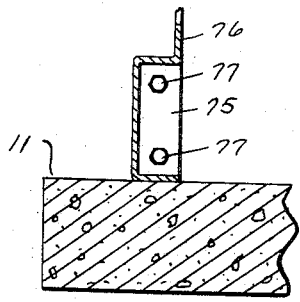
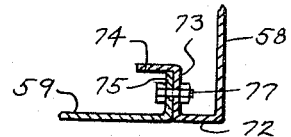
INVENTORS
JOHN L. FISHER
PAUL F. GRAMLICH
BY Lee H. Kaiser
ATTORNEY

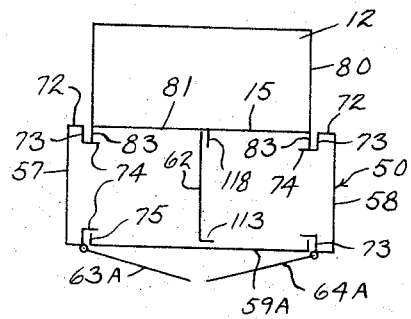

United States Patent Office 3,335,380
Patented Aug. 8, 1967

3,335,380
GROUND LEVEL TRANSFORMER WITH CABINET
Paul F. Gramlich, Zanesville, and John L. Fisher, South Zanesville, Ohio, assignors to McGraw-Edison Company, Milwaukee, Wis., a corporation of Delaware
Filed July 16, 1965, Ser. No. 472,435
20 Claims. (Cl. 336—90)

This invention relates to housings for electrical apparatus and in particular to housings for a three phase, ground level distribution transformer and associated switching and protective equipment.

Ground level three phase electrical power distribution transformer installations vary widely in kva. size, switching and sectionalizing arrangements, protective devices, and metering equipment. External loadbreak switching devices and protective equipment are often utilized. Known housings for the equipment associated with the transformer are usually custom built at great expense and shipped in fully assembled condition to the transformer site. Known housings often do not keep the equipment associated with the transformer free from rain and contamination and do not limit access to authorized operating and maintenance personnel. Further, such housings often become inadequate and obsolete when system conditions change and additional space is required to accommodate system load growth.

It is an object of the invention to provide an economical and versatile housing for a three phase ground level distribution transformer and associated switching and protective equipment which can be shipped in knocked-down condition and is modular in construction so that any desired amount of space can be provided for the switching and protective equipment by the mere addition of standard members. Another object is to provide a cabinet for the switching and protective equipment which is unitary with the transformer casing and can be expanded to the left or the right of the transformer casing to the extent desired. A further object is to provide such a housing wherein all joints between the cabinet and the transformer casing are overlapped by components of the cabinet which prevent entry of rain and contaminants into the cabinet and also prevent children from inserting sticks into the cabinet. A still further object is to provide such a cabinet which has a flush surface and is aesthetically pleasing and wherein the end panels and roof panel have high strength against bending and permit omission of corner posts and the upper sill for the doors. A still further object is to provide such a cabinet which is tamperproof and weatherproof; which contributes to the safety of the lineman but gives unobstructed access to the equipment when desired; and which provides means for easy and facile mounting of fuses, switches, lightning arresters, meters and potheads at any desired location within the cabinet.

These and other objects and advantages of the invention will be more readily apparent from the following detailed description when read in conjunction with the accompanying drawing wherein:

FIG. 3 is a front elevation view of the embodiment of FIGS. 1 and 2 with the doors open and the electrical connections shown schematically;

Figure 1:
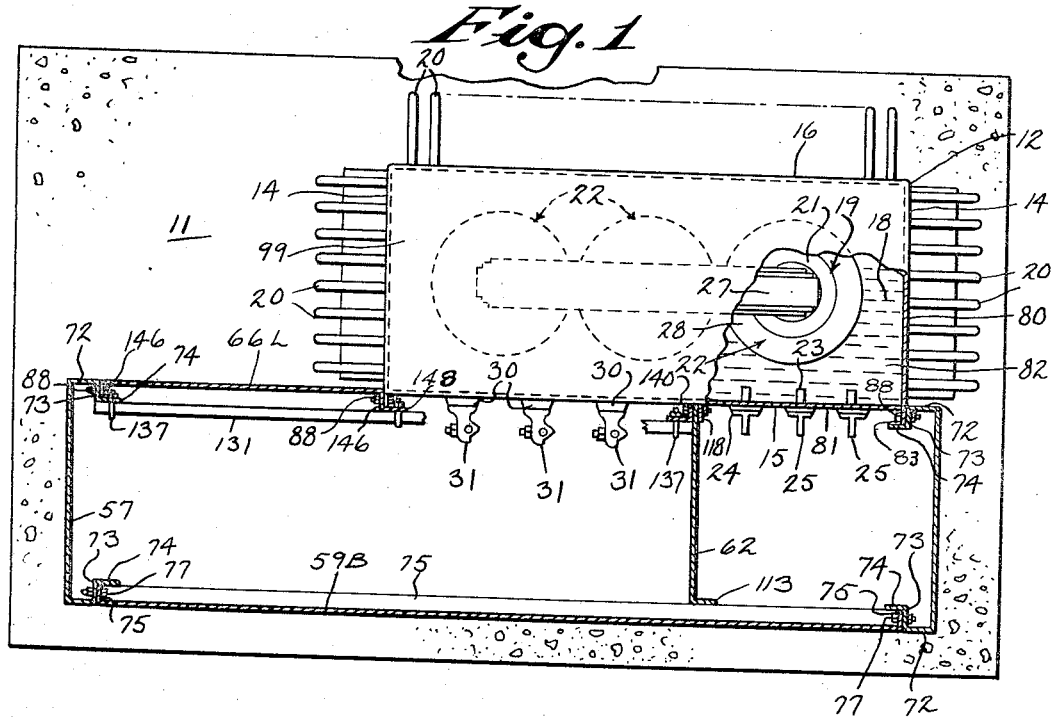
FIGURE 1 is a plan view, partly in section, of one embodiment of the invention, the switching and protective apparatus and the cabinet doors being omitted.

FIGS. 4, 5, 6, and 7 are views taken respectively on lines 4—4, 5—5, 6—6, and 7—7 of FIG. 3;

FIG. 8 is a partial view taken on line 8—8 of FIG. 3 with the cabinet doors shown in full lines in open position and in dotted lines in the closed position;

FIGS. 9A to 9D are schematic plan views of alternative embodiments of the invention, FIG. 9C representing the embodiments of FIGS. 1–8; and FIGS. 10A to 10D are schematic views analogous to FIGS. 9A–9D respectively illustrating the arrangement of standard components to achieve different amounts of cabinet space.

Referring to the drawing, the housing of the invention for a three phase distribution transformer and associated switching and protective equipment may be supported on a ground level concrete pad 11 and includes a transformer casing 12 having opposed end walls 14 and front and rear walls 15 and 16 respectively. Casing 12 may contain a suitable insulating and cooling dielectric 18 such as transformer oil, and a three phase transformer core and coil assembly 19 may be immersed in the oil 18 within casing 12. A plurality of flat cooling radiators 20 may be affixed to the end walls 14 and rear wall 16 and register with the interior of casing 12 at vertically spaced apart points. The low voltage windings 21 of the three separate phase coils 22 of the core and coil assembly 19 may be connected by conductors (not shown) to conductive bolts 23 of three secondary insulating bushings 24 mounted adjacent the upper end of front casing wall 15 and preferably terminating in spade terminals 25. Each phase coil 22 may surround a winding leg of the magnetic core 27 of the core and coil assembly 19, and the primary windings 28 of the phase coils 22 may be connected by conductors (not shown) to conductive studs of three primary insulating bushings 30 mounted adjacent the upper end of front casing wall 15 and preferably terminating in eyebolt connectors 31.

The switching and protective and metering equipment utilized with a three phase distribution transformer may vary widely with the system voltage, the anticipated load, the kva. size of the transformer, the geographical area, and the practises of the particular utility, and consequently the space required for housing such equipment will also vary from installation to installation. Only one typical arrangement is shown in the drawing, but the modular construction of the invention achieves maximum flexibility and can be used on loop or radial systems and can be adapted to meet practically all switching, sectionalizing, or other power system requirements. FIG. 3 illustrates an arrangement for source-isolated sectionalizing in a loop system wherein either of two power sources may independently energize the transformer winding or the two sources may be interconnected.

Three current limiting fuses 34 are supported on a mounting panel 35 below the three primary insulating bushings 30. One terminal 36 of each current limiting fuse 34 is connected by a conductor 38, shown schematically in FIG. 3, to the eyebolt connector of one of the primary insulating bushings 30. Three disconnect switches 40A individually connected to the cable conductors 41 of one three phase power source shown schematically in FIG. 3 may be supported on a mounting panel 42, and three similar disconnect switches 40B individually connected to the cable conductors 44 of an alternate three phase power source may be supported on a mounting panel 45.

The fuses 34 are preferably pivotally mounted adjacent the lower terminal 36, and the disconnect switches 40A and 40B are also preferably pivotally mounted adjacent the line terminals 46 thereof which are electrically connected to the power line conductors 41 and 44. The current limiting fuses 34 may be of the type disclosed in the copending application Ser. No. 313,640, now abandoned, filed Oct. 10, 1963, and the disconnect switches 40A and 40B may be of the type disclosed in the copending application Ser. No. 298,882, now Patent No. 3,235,696, filed July 31, 1963, both applications being in the name of Harvey W. Mikulecky and having the same assignee as the subject invention. For each phase of the power system, a terminal 47 connected to the stationary contact of one fuse 34, a terminal 48 connected to the stationary contact of one disconnect switch 40A, and a terminal 48 connected to the stationary contact of one disconnect switch 40B may be electrically commoned by a conductor 49 shown schematically in FIG. 3 to interconnect the two power sources when the switches 40A and 40B are closed.

The schematically illustrated conductors 41 and 44 are usually underground cables extending through conduits (not shown) in concrete pad 11 and being terminated by suitable stress relief cones (not shown). The disconnect switches 40A and 40B are capable of interrupting load current to the transformer primary windings 28 with minimum noise and minimum generation of gas and ionized particles, and switches 40A and 40B may be quickly and safely operated by a standard switch stick to open the power sources over the underground cables 41 and 44 respectively.

The fuses 34 and the disconnect switches 40A and 40B supported on the mounting panels 35, 42, and 45 respectively are enclosed within a cabinet 50 one side of which is at least partially defined by the front wall 15 of transformer casing 12. Cabinet 50 is of modular construction and can be shipped in knocked-down condition and may comprise any desired number of sections to the left and/or the right of transformer casing 12. FIG. 9 illustrates four possible embodiments of cabinet 50. FIG. 9A is a schematic plan view of the basic cabinet 50 mating with transformer casing 12; FIG. 9B shows an alternative embodiment wherein two additional sections 52 and 53 are added to the right of transformer casing 12 and basic cabinet 50 and one additional section 54 is assembled to the left thereof; FIG. 9C schematically shows the embodiment of FIGS. 1–8 wherein only one section 54 is added to the left of casing 12 and the basic cabinet 50; and FIG. 9D illustrates an embodiment wherein two sections 54 and 55 are added to the left of the basic cabinet 50 and transformer casing 12.

FIGS. 10A to 10D are single line drawings schematically illustrating certain of the standard end, back, door, partition, and sill panels which make up the typical installations illustrated in FIGS. 9A to 9D respectively. The basic cabinet 50 is partially defined by transformer casing 12 and includes left and right end panels 57 and 58 respectively, a removable front sill 59A, a partition 62, a left door 63A, a right door 64A, and a cabinet cover. When one additional section 54 is assembled to the left of basic cabinet 50 and transformer casing 12 as in the embodiment of FIGS. 1 to 8 and 9C and 10C, one additional back panel 66L is added to the basic cabinet 50 shown in FIG. 10A; the front sill 59B is made longer than the front sill 59A of the basic cabinet 50, and the left door 63B comprises two door panels 68 and 68 hinged together rather than the single left door panel 63A of the basic cabinet 50. When two sections 54 and 55 are added to the left of transformer casing 12 and basic cabinet 50 as in the embodiment of FIG. 10D, two back panels 66L are added to the basic cabinet 50; the front sill 59C is made longer than the front sill 59A of the basic cabinet 50; and the left door 63C comprises three door panels 68, 69, and 70 hinged together rather than the single door 63A of the basic cabinet 50.

Each end panel 57 and 58 has vertical portions 72 adjacent its ends bent over at right angles to the plane thereof, and each bent-over portion 72 has an inwardly extending portion 73 and terminates in an offset portion 74, thereby increasing the flexural strength of the end panels 57 and 58 and permitting omission of corner posts for the cabinet. The front sill 59 is only a fraction of the height of the end panels 57 and 58 and extends across the front of the cabinet between end panels 57 and 58 and has a turned-in marginal flange 75 around the periphery thereof and an offset portion 76 at its upper end. The vertical portions of the marginal flange 75 of the front sill 59A abut against the inwardly extending portions 73 of the end panels 57 and 58, thereby providing a flush outer surface for the cabinet and waterproof joints between end panels 57 and 58 and sill 59 wherein the offset portions 74 overlap the joints and prevent entrance of rain and moisture into the cabinet. Bolts 77 extending through registering apertures in marginal flange 75 of sill 59 and the inwardly extending portions 73 removably secure front sill 59 to the end panels 57 and 58, thereby enabling the transformer casing 12 and cabinet 50 to be moved onto concrete pad 11 without disturbing the conduits (not shown) through which cables 41 and 44 extend through concrete pad 11 and the stress relief cones (not shown) which terminate the cable conductors 41 and 44.

Transformer casing 12 is preferably constructed of a U-shaped member 80 (see FIG. 1) having the walls thereof disposed in vertical planes and defining the casing end walls 14 and casing rear wall 16 and an L-shaped member disposed between the legs of the U-shaped member 80 with the longer leg 81 disposed vertically and defining casing front wall 15 and the shorter leg 82 disposed horizontally and spaced a small distance above concrete pad 11 and defining the casing bottom wall. The L-shaped member is welded to U-shaped member 80 so that the ends 83 of the legs of the U-shaped member 80 extend beyond the longer leg 81 which defines the front wall 15 of transformer casing 12. The projecting ends 83 of U-shaped casing member 80 provide vertical flanges for casing 12 and have a plurality of vertically spaced apart holes therein and are adapted to abut against the inwardly extending portions 73 of the end panels 57 and 58. A plurality of vertically spaced apart holes in the inwardly extending portions 73 of end panels 57 and 58 register with the holes in the casing flanges 83, and the registering holes receive bolts 88 (see FIG. 1) which secure the end panels 57 and 58 to casing 12 in the embodiment of FIG. 10A. The spacing of bottom casing wall 82, defined by the longer leg of the L-shaped member, above concrete pad 11 permits air circulation and allows the tank bottom member to remain dry, thereby preventing corrosion.

Figure 2:
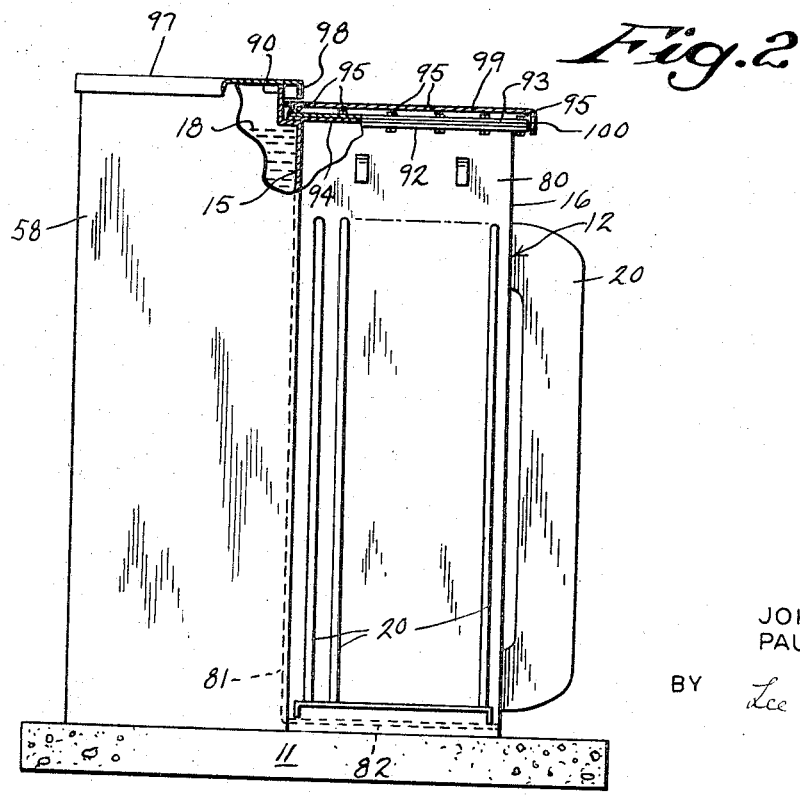
FIG. 2 is an end view, partly in section, of the housing of the embodiment of FIG. 1.

The longer leg 81 of the L-shaped member which defines front casing wall 15 has an outwardly projecting L-shaped offset portion 90 adjacent the upper edge thereof (see FIG. 2). The upper edge of U-shaped member 80 of transformer casing 12 is bent horizontally outward in a peripheral flange 92, and a transformer casing cover 93 is secured to casing 12 with a resilient gasket 94 compressed therebetween by bolts 95 extending through clearance holes in peripheral flange 92 and in the horizontal shorter leg of the L-shaped offset portion 90.

A cabinet cover 97 is supported on end panels 57 and 58 and has a depending rear flange 98 (see FIG. 2) which overlaps the longer leg of the offset L-shaped portion 90 at the upper end of cross-piece 81 to keep rain and contamination out of cabinet 50. It will be noted that equipment housed within cabinet 50 is kept free from rain and contamination because all components of cabinet 50 overlap the flanges of transformer casing 12, namely, depending rear flange 98 on cabinet cover 97 overlaps the offset flange 90 at the upper end of casing front wall 15 and offset portions 74 on end panels 57 and 58 overlap the vertical flanges 83 on casing 12.

A protective cover 99 (see FIG. 2) disposed above the gasketed casing cover 93 has a depending peripheral flange 100 which prevent access to the cover securing bolts 95.

Cabinet cover 97 rests upon the upper ends of end panels 57 and 58 which may terminate at their upper and lower ends in inwardly bent portions 101, and cabinet 50 may be secured to concrete pad 11 by means engaging the inwardly bent portions 101 at the lower end of end panels 57 and 58 and including bolts (not shown) embedded in concrete pad 11. Cabinet cover 97 may be secured to end panels 57 and 58 by L-shaped members 103 (see FIG. 3) having the longer legs thereof secured by bolts 104 to bosses welded to the inner surface of cabinet cover 97 and the shorter leg thereof fitting under inwardly bent edges 101 of end panels 57 and 58.

The front edge of cabinet cover 97 has an offset depending portion 105. Left door 63 and right door 64 normally close the cabinet 50, and in the embodiment of FIG. 10A both the left and right doors are single panels 63A and 64A. Doors 63 and 64 have hinge eyes 107 (see FIG. 8) welded thereto at one vertical edge adapted to fit over hinge pins 108 welded adjacent the inwardly extending portions 73 of the end panels 57 and 58. The peripheral edges of the panels comprising doors 63 and 64 are bent to provide inwardly extending flanges 110. The offset portions 74 of the end panels 57 and 58, the offset portion 76 of sill 59A, and the offset portion 105 of cabinet cover 97 together form a recessed door frame which receives the inwardly extending flanges 110 of door panels 63 and 64, thereby providing a flush surface and an aesthetically pleasing construction wherein all door joints are overlapped by offset portions 74, 76, and 105 of the cabinet components, positively keeping rain and contaminants out of cabinet 50, and making the cabinet tamperproof so that children cannot insert sticks into the cabinet.

The hinge pins 108 and hinge eyes 107 permit removal of the doors 63 and 64 when the door 64 is unlocked, thus giving unobstructed access to the interior of cabinet 50.

Vertical partition 62 within cabinet 50 separates the low voltage compartment enclosing the secondary bushings 24 from the high voltage compartment enclosing the primary bushings 30 and fuses 34 and disconnect switches 40, thereby preventing a lineman from coming into contact with high voltage equipment when working on the low voltage side of the transformer. Partition 62 may have a laterally extending flange 113 at its front end secured by bolts 114 to the offset portions 105 and 76 of cabinet cover 97 and front sill 59 respectively. The rear edge of partition 62 may be secured to front casing wall 15 by bolts 116 (see FIG. 1) projecting through registering clearance holes in partition 62 and in a vertical flange 118 projecting outwardly from cross-piece 81 (which defines casing front wall 15) and disposed between the secondary insulating bushings 24 and the primary insulating bushings 30.

Left door 63 is held in closed position after the normally latched right door 64A is opened to provide maximum safety to operating and maintenance personnel. Plates 120 secured by bolts to the offset portions 105 and 76 of cabinet cover 97 and front sill 59 carry clips 121 (see FIG. 3) having non-circular openings therein which receive rotatable fasteners 122 (see FIG. 8) secured adjacent upper and lower edges of left door 63A and having complementary non-circular portions which protrude into the openings in clips 121 and normally hold left door 63A closed. Fasteners 122 may be loosened from clips 121 after a fractional turn by a screwdriver to rotate the complementary non-circular portions on fastener 122 into alignment with the non-circular opening in clip 121, thus permit opening of left door 63A. The fasteners 122 and a laterally extending latching portion 125 of left door 63 are normally covered by latched right door panel 64A to interlock left and right doors 63 and 64 and prevent access to cabinet 50 by unauthorized personnel. Right door 64A is normally latched by vertically extending upper and lower door locking rods 126 and 127 secured adjacent one end to a pivoted lever 128 and adapted at their upper and lower ends respectively to fit behind offset portion 105 of cabinet cover 97 and offset portion 76 of front sill 59 to prevent opening of right door 64A. Lever 128 is secured to one end of a shaft which rotatably protrudes through right door 64A and is affixed at its other end to a rotatable handle 129. Rotation of handle 129 turns lever 128 and raises and lowers door locking rods 126 and 127. Handle 129 has a padlock receiving aperture therein adapted to register with a padlock staple 130 affixed to right door 64A, and rotation of handle 129 to the horizontal position to unlock right door 64A is prevented when a padlock is inserted through staple 130 and the padlock receiving aperture in handle 129.

The supporting panels 35, 42, and 45 for the fuses 34 and disconnect switches 40 may be mounted at any desired location within cabinet 50 on horizontally extending equipment mounting rails 131 having spaced apart holes 132 and slots 133 therein. Lightning arresters 134 for each of the power system phases may be secured by suitable brackets 135, which may be of U-shape, to the equipment mounting rails 131. The rails may be placed at any desired vertical level within cabinet 50 by U-bolts 137 adapted to fit over the rails 131. The ends of the legs of U-bolts 137 are adapted to fit within any of a plurality vertically spaced apart apertures 138 provided in the offset portions 74 of the end panels 57 and 58 and also in a vertically extending angle bracket 140 affixed by the bolts 116 which secure partition 62 to outwardly projecting flange 118 on casing front wall 15.

In the embodiment illustrated in FIGS. 1–8 and 9C and 10C wherein a section 54 is added to the left of the basic cabinet 50, one additional back panel 66L is disposed between transformer casing 12 and left end panel 57, the front sill 59B is made longer than the sill 59A of the basic cabinet 50 of the FIG. 10A embodiment, the cabinet cover 97 is made longer than for the basic cabinet 50 and left door 63B comprises two door panels 68 and 69 hinged together by hinge pins on door panel 68 mating with hinge eyes on door panel 69. Back panel 66L preferably has bent-over flanges 146 at its vertical edges which are provided with a plurality of spaced apart vertical holes and abut respectively against the inwardly extending portion 73 of the left end panel 57 and against the projecting vertical flange 83 on transformer casing 12, and bolts 88 (see FIG. 1) protruding through such registering holes secure back panel 66L to left end panel 57 and casing 12. The bent-over flange 146 on the right end of back panel 66L has an offset vertical portion 148 provided with a plurality of spaced apart holes 138 which receive the U-bolts 137 for the equipment mounting rails 131. Both door panels 68 and 69 carry adjacent their upper and lower ends the fasteners 122 with non-circuit locking portions, and plates 120 carrying clips 121 having complementary non-circular openings for the fasteners 122 on both door panels 68 and 69 are secured to the offset portions 105 and 76 of cabinet cover 97 and front sill 59B. The fasteners 122 on door panel 68 are normally covered by door panel 69 and the fasteners 122 on door panel 69 are normally covered by door panel 64A, and consequently access cannot be gained thereto until right door 64A is unlatched.

In the embodiment of FIGS. 9D and 10D wherein two sections 54 and 55 are added to the left of basic cabinet 50, two side-by-side back panels 66L are disposed between left end panel 57 and transformer casing 12, the cabinet cover 97 and front sill 59C are made longer than the sill 59A for the basic cabinet 50, and the left door 63C comprises three door panels 68, 69, and 70 hinged together by hinge pins on one door panel pivotally engaging hinge eyes on the adjacent door panel. The bent-over flange 146 of the left back panel 66L abuts against the inwardly extending portion 73 of the left end panel 57 and the other bent-over flange 146 thereof abuts against a bent-over flange 146 on the adjacent right back panel 66L and is secured thereto by bolts extending through registering holes in the abutting flanges 146. The bent-over flange 146 on the right back panel 66L abuts against and is secured to the outwardly projecting vertical flange 83 on transformer casing 12, and both back panels 66L have offset vertical portions 148 each of which is provided with a plurality of vertically spaced apart holes 138 which receive the U-bolts 137 for the equipment mounting rails 131.

The embodiment of FIGS. 9B and 10B is similar to the embodiment of FIGS. 1–8 and 9C and 10C with the exception that two sections 52 and 53 are added to the right of the basic cabinet 50. A mullion divider 149 and two back panels 66R and 66R' similar to back panels 66L, are disposed between transformer casing 12 and right end panel 58. Mullion divider 149 may comprise front and rear vertical members 152 and 153, shown schematically in FIG. 10B, interconnected by upper and lower horizontal members 154, and upper horizontal member 154 may be of inverted channel cross section so that it interfits with the depending end flanges of both cabinet covers and forms a rain runoff slot. The front and rear vertical members 152 and 153 may be generally of hat shape cross section with inwardly extending portions 155 provided with a plurality of vertically spaced apart apertures. The inwardly projecting portions 155 of rear vertical member 153 abut against and are secured to the vertical flange 83 on the right end of transformer casing 12 and the bent-over vertical edge 156 of back panel 66R. The rear vertical member 153 of mullion divider 149 has offset portions 157 provided with vertically spaced apart holes which receive the bolts 137 for supporting the equipment mounting rails 131.

It will be appreciated that mullion divider 149 is adapted to mate with the vertical flanges 83 at the left or right edges of casing front wall 15 to permit additional cubicles to be added to the left or right of casing 12 and that the modular cabinet is adapted to mate with a plurality of transformer casings 12. Two cabinet covers are provided when a mullion divider is utilized so that a minimum number of standard cabinet cover sizes need be warehoused.

Partitions 62 may be provided at any mullion divider or any door joint between any of the cubicles such as between cubicles 52 and 53 or between cubicles 54 and 55, and such partitions may at their back edge engage the bent-over flanges on back panels 66 or the inwardly bent portions 155 of the mullion divider 149 and at their front edge engage the offset portions 76 and 105 of the front sill 59 and the cabinet cover 97 respectively.

The embodiment of FIGS. 9B and 10B has a second front sill 59E to the right of the basic cabinet 50 disposed between mullion divider 149 and right end panel 58, and the vertical portions of marginal flange 75 on front sill 59E abut against the inwardly extending portion 73 of right end panel 58 and against inwardly extending portion 155 of front vertical member 153 of mullion divider 149. A pair of doors 163 and 164 for the sections 52 and 53 are similar to the doors 63A and 64A of the embodiment of FIGS. 9A and 10A and have hinge eyes secured thereto adapted to fit over hinge pins affixed to mullion divider 149 and to right end panel 58. The front vertical member 153 of the mullion divider 149 has offset portions 157 against which the marginal flange 110 on doors 64A and 163 fit to provide a flush surface for the cabinet and which also overlap the edges of doors 64A and 163 to prevent entrance of moisture and contamination into the cabinet.

Although only one embodiment of the invention has been disclosed in detail and a few other embodiments shown schematically, many other modifications and variations of the invention will be readily apparent to those skilled in the art, and consequently it is intended in the appended claims to cover all such modifications and variations which are within the true spirit and scope of the invention.

We claim:

1. In combination, a casing having a front wall provided with an upstanding top edge, a transformer core and coil assembly within said casing including a magnetic core linked by primary and secondary windings, a cover for said casing, primary and secondary insulating bushings on said front wall connected interior of said casing to said primary and secondary windings respectively, a cabinet having vertical wall portions defined by vertical members each of which has vertical flanges adjacent its vertical edges transverse to the cabinet front and rear wall portions and said vertical flanges of adjacent vertical members being in abutting relation, said members defining said cabinet vertical wall portions including said casing front wall, opposed end panels, and a front sill smaller in height than said end panels and disposed between said end panels and having an offset upstanding portion adjacent the top edge thereof, a cabinet cover supported on said end panels and having a depending rear flange overlapping said upstanding top edge on said casing front wall to prevent entry of moisture into said cabinet and having a depending offset portion adjacent the front edge thereof, said vertical flanges of said end panels being adjacent the front and rear edges thereof and having front and rear portions offset from said vertical flanges and transverse to the plane of said end panels and overlapping the vertical flanges of adjacent vertical members, said front offset portions of said end panels overlapping said vertical flanges on said front sill, said cabinet having a front access opening between said front sill and said cabinet cover and said end panels, means including a pair of doors for closing said access opening, said front offset portions of said end panels and said offset portions of cabinet cover and said sill together forming a recessed frame receiving said doors when said doors are closed and providing a flush surface for said cabinet and preventing entry of moisture and rain into said cabinet, and means for locking said doors closed.

2. In the combination defined by claim 1 wherein said vertical flanges on said end panels adjacent the rear edge thereof abut against said vertical flanges on said casing front wall and said rear offset portions on said end panels overlap said vertical flanges on said casing front wall.

3. In the combination defined by claim 1 wherein said cabinet includes a vertical rear panel having turned-in vertical edges one of which abuts against one of said vertical flanges on said casing front wall and the other of which is constructed and arranged to abut against said vertical flange adjacent the rear edge of one of said end panels.

4. In the combination defined by claim 3 wherein said rear offset portion on said one end panel has a plurality of vertically spaced apart first apertures therein and overlaps said other turned-in vertical flange or said rear panel and said one turned-in vertical edge on said rear panel has an offset portion parallel to the plane of said rear panel and overlapping said one vertical flange on said casing front wall and being provided with a plurality of vertically spaced apart second apertures therein, and including a horizontal equipment mounting rail within said cabinet, and means engaging certain of said first and second apertures for supporting said equipment mounting rail within said cabinet.

5. In the combination defined by claim 1 wherein said front sill and said cabinet cover carry locking means having non-circular openings therein and one of said doors carries rotatable fasteners having non-circular portions complementary to and adapted to protrude into said non-circular openings and to be turned to a position wherein said fasteners cannot be withdrawn from said openings and wherein the other door when in closed position covers said fasteners on said one door and carries latching means for locking said other door closed.

6. In the combination defined by claim 5 wherein said casing front wall has a third outwardly projecting vertical flange positioned between said primary and secondary insulating bushings and including a vertical partition within said cabinet disposed transverse to said front wall and to said front sill and being secured adjacent its rear edge to said third flange and adjacent its front edge to said front sill and to said depending portion adjacent the front edge of said cabinet cover and wherein said partition divides said cabinet into a primary compartment containing said primary insulating bushings and a secondary compartment containing said secondary insulating bushings and wherein said one door normally closes said primary compartment and said other door normally closes said secondary compartment.

7. In the combination defined by claim 1 wherein said casing front wall has a third outwardly projecting vertical flange positioned between said vertical end flanges and between said primary and secondary insulating bushings and including a vertical partition within said cabinet disposed transverse to said casing front wall and to said front sill and being secured adjacent its rear edge to said outwardly projecting third flange and adjacent its front edge to said front sill and to said depending portion adjacent the front edge of said cabinet cover.

8. In the combination defined by claim 7 wherein a vertical member parallel to said casing front wall and having a plurality of vertically spaced apart first apertures therein is secured to said third flange and said rear offset portion on one of said end panels is provided with a plurality of vertically spaced apart second apertures therein and including a horizontal equipment mounting rail within said cabinet and means engaging certain of said first and second apertures for supporting said equipment mounting rail within said cabinet.

9. In the combination defined by claim 3 wherein one of said doors includes a pair of door panels hinged together and one of said end panels carries adjacent the front edge thereof hinge means for mounting one of said pair of door panels, both said door panels carrying rotatable fasteners having non-circular portions, said front sill and said cabinet cover carrying locking means having non-circular openings complementary to and adapted to receive said non-circular fasteners and wherein said fasteners are rotatable to a position wherein said non-circular portions cannot be withdrawn from said non-circular openings and said door panels are latched, closed, the other of said pair of door panels when in closed position covering said fasteners of said one door panel and said other door when in closed position covering said fasteners on said other door panel and carrying means for locking said other door closed.

10. In the combination defined by claim 3 and including a mullion divider having spaced apart front and rear vertical members provided with turned-in vertical edges and said turned-in edges having offset portions parallel to said casing front wall and wherein one of said turned-in edges of said rear vertical member abuts against one of said vertical flanges on said casing front wall and the other turned-in edge thereof abuts against one of said turned-in vertical edges of said rear panel and wherein said cabinet includes a pair of front sills each of which is disposed between said mullion divider and one of said end panels and two pairs of doors and wherein hinge means are carried on each end panel for one door of each pair of said front vertical member of said mullion divider carries hinge means for one door of both of said pairs.

11. In the combination defined by claim 1 wherein said casing front wall has an offset upstanding L-shaped portion at the upper end thereof and said depending rear flange on said cabinet cover overlaps the longer leg of said L-shaped offset portion and the side and rear walls of said casing having horizontally extending flanges at the upper edges thereof and said horizontally extending flanges and the shorter leg of said L-shaped offset portion have apertures therein, and means including a plurality of bolts extending through said apertures for removably securing said casing cover to said casing.

12. In combination, a casing having a front wall provided with an upstanding front edge, a transformer core and coil assembly within said casing including a magnetic core linked by primary and secondary windings, a cover for said casing, primary and secondary insulating bushings on said front wall connected interior of said casing to said primary and secondary windings respectively, a cabinet having the vertical walls thereof defined by members having vertical flanges adjacent their vertical edges disposed in planes transverse to the cabinet front and rear walls and said vertical flanges on adjacent members being in abutting relation, said members defining said cabinet vertical walls including said casing front wall, opposed end panels, and a front sill smaller in height than said end panels and disposed between said end panels; a cabinet cover supported on the upper end of said end panels and having a depending rear flange adapted to overlap said upstanding top edge of said casing front wall, said cabinet having an access opening between said front sill and said cabinet cover and said end panels, means including a pair of doors for closing said access opening, said vertical flanges on said end panels being adjacent the front and rear edges thereof and said end panels also having front and rear portions offset from said vertical flanges and transverse to the plane of said end panels and overlapping said vertical flanges on adjacent said vertical members and preventing entry of moisture into said cabinet, said front offset portions on said end panels overlapping said vertical flanges on said front sill.

13. In the combination defined by claim 12 wherein said front sill has an upstanding offset portion at the upper edge thereof and said cabinet cover has a depending offset portion adjacent the front edge thereof and said front offset portions on said end panels and said offset portions on said cabinet cover and said front sill together define a recessed frame for said doors and provide a flush surface for said cabinet and said offset portions overlap the peripheral edges of said doors and prevent entry of moisture into said cabinet.

14. In the combination defined by claim 13 wherein said doors have turned-in marginal edges and said end panels carry adjacent their front edges hinge means for mounting said doors and the turned-in marginal edges of said doors are adjacent said vertical flanges on said end panels adjacent the front edge thereof and including means for locking said doors closed.

15. In the combination defined by claim 12 wherein said vertical flanges adjacent the rear edges of said end panels abut against the vertical flanges on the casing front wall and said rear offset portions on said end panels overlap said vertical flanges on said casing end wall.

16. In the combination defined by claim 13 and including a vertical rear panel having turned-in vertical edges disposed between said casing and one of said end panels and one of said turned-in edges of said rear panel abuts against one of said vertical flanges on said casing front wall and the other turned-in edge thereof is constructed and arranged to abut against said vertical flange adjacent the rear edge of said one end panel.

17. In the combination defined by claim 16 wherein said rear offset portion of said one end panel has a plurality of vertically spaced apart first apertures therein and is constructed and arranged to overlap said other turned-in edge of said rear panel and the other turned-in edge of said rear panel has an offset portion having a plurality of vertically spaced apart second apertures therein and overlaps said one vertical flange on said casing front wall and including a horizontal equipment mounting rail within said cabinet and means engaging certain of said first and second apertures for supporting said equipment mounting rail within said cabinet.

18. In the combination defined by claim 13 wherein said front casing wall has a third outwardly extending flange disposed between said primary an dsecondary bushings and including a vertical partition within said casing affixed adjacent its rear edge to said third flange and adjacent its front edge to said front sill and to said depending portion of said cabinet cover and dividing said cabinet into primary and secondary compartments.

19. In the combination defined by claim 18 including a vertical member parallel to said casing front wall and having a plurality of vertically spaced apart first apertures therein and being secured to said third flange and wherein said rear offset portion of one of said end panels has a plurality of vertically spaced apart second apertures therein and including a horizontal equipment mounting rail within said cabinet and means engaging at least one of said first and at least one of said second apertures for supporting said rail within said cabinet.

20. A housing for an electrical distribution transformer and associated switching and protective equipment comprising, in combination, a four-sided metallic casing formed by a U-shaped member and a cross-piece disposed between and secured to the legs of said U-shaped member and said legs extending beyond said cross-piece and defining vertical flanges on said casing, a cover for said casing, a transformer core and coil assembly within said casing including a magnetic core linked by primary and secondary windings, primary and secondary insulating bushings on the exterior of said cross-piece and connected interior of said casing to said primary and secondary windings respectively, a cabinet for said equipment having a rear wall at least partially defined by said cross-piece and including opposed vertical end panels having front and rear bent-over vertical edges each of which is provided with a vertical portion parallel to the plane of said end panel and an offset portion transverse to said plane, said vertical portion of said rear bent-over edge of each end panel being constructed and arranged to abut against one of said casing vertical flanges and said offset portion being adapted to fit behind said vertical flange and prevent entry of moisture into said cabinet, a front sill smaller in height than said end panels and disposed between said end panels and having turned-in vertical edges abutting against said vertical portions of said front bent-over edges of each said end panel and also having an upstanding offset top edge portion, a cabinet cover supported on said end panels and having a depending rear flange overlapping the upper edge of said cross-piece to prevent entry of rain and moisture into said cabinet and having a depending offset front edge portion, said cabinet having a front access opening between said front sill and said cabinet cover and said end panels, means including a pair of doors for closing said access opening, hinge means on said end panels for mounting said doors, said doors having turned-in peripheral edge, said offset portions on said front bent-over edges on said end panels and said offset portions on cabinet cover and said sill together defining a recessed frame receiving said doors when said doors are closed and providing a flush surface for said cabinet and said offset portions overlapping said turned-in peripheral edges of said doors and preventing entry of moisture and rain into said cabinet, and means for locking said doors closed.

References Cited

UNITED STATES PATENTS

| | | | |
|---|---|---|---|
| 1,816,034 | 7/1931 | Wood | 317—120 |
| 2,740,905 | 4/1956 | Henderson | 336—90 X |
| 3,170,091 | 2/1965 | Hudson | 317—120 X |

LEWIS H. MYERS, *Primary Examiner.*

T. J. KOZMA, *Assistant Examiner.*